United States Patent
Michel et al.

(10) Patent No.: US 6,305,588 B1
(45) Date of Patent: Oct. 23, 2001

(54) RELEASABLE COUPLING FOR A SUSPENSION STUD ON A WALL OF A MOBILE TELEPHONE

(75) Inventors: Stéphane Michel, Montfort sur Meu; Laurent Paul Joseph Lamballais, Gévezé; Jean-Yves Raymond Renard, Rennes; Vincent Antoine Victor Belaïche, Vitré, all of (FR)

(73) Assignee: Mitsubishi Electric France, Nanterre (FR)

(*) Notice: Subject to any disclaimer, the term of this patent is extended or adjusted under 35 U.S.C. 154(b) by 0 days.

(21) Appl. No.: 09/526,552

(22) Filed: Mar. 16, 2000

(30) Foreign Application Priority Data

Mar. 17, 1999 (FR) .................................................. 99 03327

(51) Int. Cl.$^7$ ....................................................... A45F 5/00
(52) U.S. Cl. ........................... 224/271; 224/195; 224/197; 224/930; 24/3.12; 24/615; 455/90; 455/100; 455/351; 455/575
(58) Field of Search ..................................... 224/191, 195, 224/197, 242, 269, 271, 272, 930; 24/3.1, 3.12, 590, 615; 248/220.21; 455/90, 100, 351, 575

(56) References Cited

U.S. PATENT DOCUMENTS

| | | | |
|---|---|---|---|
| D. 436,948 | * 1/2001 | Carlson et al. ..................... D14/240 |
| 5,014,892 | * 5/1991 | Copeland ............................. 224/271 |
| 5,597,102 | * 1/1997 | Saarikko et al. ..................... 224/197 |
| 5,604,958 | * 2/1997 | Anscher .................................. 24/3.1 |
| 5,620,120 | 4/1997 | Tien . | |
| 5,787,341 | * 7/1998 | Parkas et al. ........................... 455/90 |
| 5,799,847 | * 9/1998 | Sandor ................................. 224/197 |
| 5,906,031 | * 5/1999 | Jensen ................................. 24/3.12 |

FOREIGN PATENT DOCUMENTS 0 777 371  6/1997 (EP) .

* cited by examiner

Primary Examiner—Stephen K. Cronin
(74) Attorney, Agent, or Firm—Oblon, Spivak, McClelland, Maier & Neustadt, P.C.

(57) ABSTRACT

A releasable coupling for a suspension stud on a first face wall, especially of a mobile telephone. The coupling includes an orifice made in the wall and a device for axial retention of the stud, a coupling end of which is accommodated in the orifice in order to perform the coupling. The retention device includes a rod which passes through the orifice and is provided at its free end with a device for bearing axially on the perimeter of the orifice. The retention device can move, along a coupling path, between a coupling position in which the bearing device is applied against the wall and an uncoupled position in which the axial bearing device is disengaged from the wall. A device is furthermore provided for immobilizing the retention device with respect to the wall in its coupling position.

18 Claims, 3 Drawing Sheets

RELEASABLE COUPLING FOR A SUSPENSION STUD ON A WALL OF A MOBILE TELEPHONE

The present invention relates to a releasable coupling for a suspension stud on a first face of a wall, especially of a casing of a mobile item of telecommunication, of the type comprising:
- an orifice made in the wall and emerging on said first face of the wall;
- a device for axial retention of the stud, a coupling end of which is accommodated in said orifice in order to perform the coupling.

It is known to provide a stud on the rear face of mobile telephones which allows the person carrying the telephone to suspend it from his belt. For this purpose, a complementary fork-shaped support device is provided on the belt. It allows the suspension stud to be retained in the notch defined between the two branches of the fork.

Not all mobile telephone users make use of this option of hanging the mobile telephone from a belt. Thus, the suspension stud must be able to be removed by users not making use thereof.

Several solutions have been proposed.

The mobile telephone sold under the reference MT30 MITSUBISHI includes a suspension stud which is fixed to the rear face of the telephone with the aid of a double-sided adhesive tape. This solution has the drawback that, after removing the stud, traces of the adhesive tape remain visible on the rear face. In addition, this way of fixing the stud is not very reliable and does not allow the stud to be positioned accurately.

Another mobile telephone manufacturer has proposed that the suspension stud be engaged inside a slot made on the rear face of the telephone. This slot emerges in the housing for accommodating the telephone's supply battery. It is only possible to fit the suspension stud when the battery has been removed. After fitting the battery, the latter holds the stud in position.

This solution has the drawback that the position of the stud depends on the size of the battery. In addition, this coupling is not very reliable since there is a risk of the suspension stud being lost when the battery is removed.

Yet other mobile telephones have a metal nut inserted into the rear wall of the telephone. This nut emerges on the external face of the telephone and allows the suspension stud to be fixed by means of a screw which passes through it.

This solution is relatively expensive because of the need to insert a metal nut into the rear face of the mobile telephone, which is made of plastic. In addition, given that few users wish to benefit from the option of suspending the telephone from a belt, this nut is often unused. It therefore increases the weight of the telephone unnecessarily. Furthermore, there is a risk of the screw for fixing the stud becoming unscrewed due to the effect of vibrations.

The object of the invention is to propose a releasable coupling for a suspension stud, especially on a wall of a mobile telephone, which is reliable, lightweight, inexpensive and easy to use, and the wall of the telephone of which is simple to produce.

For this purpose, the subject of the invention is a releasable coupling for a suspension stud on a first face of a wall, especially of a casing of a mobile item of telecommunication, of the aforementioned type, characterized in that said orifice emerges on the second face of the wall opposite said first face and said retention device includes a rod which passes through the orifice and which is provided at its free end with means for bearing axially around the perimeter of the orifice on the second face of the wall, which retention device can move, along a coupling path, between a coupling position in which the axial bearing means are applied against the second face of the wall, the wall lying between the stud and the axial bearing means, and an uncoupled position in which the axial bearing means are disengaged from said wall, and in that means are provided for immobilizing the retention device with respect to the wall in its coupling position.

Depending on the particular embodiments, the releasable coupling has one or more of the following characteristics:
- said coupling path is defined by a rotational movement about the axis of the rod;
- said bearing means include at least one protuberance extending transversely at the free end of the rod, and said orifice has, for the or each protuberance, a notch emerging in that region of the orifice which is intended for passage of the rod;
- said immobilizing means include a lock linked in rotation with said retention device, which lock can move between an unlocked position in which the retention device can be rotated and a locking position in which the retention device is prevented from rotating with respect to the wall;
- the lock is disengaged from the notches in its unlocked position and is engaged in at least one notch in its locking position;
- a device is provided for reinforcing the retention of the lock in its locking position;
- said retention-reinforcing device is either a plug for closing off the orifice in the absence of the suspension stud, or a projection made on a support having a profile suitable for retaining said stud;
- said immobilizing means include, on the one hand, at least one pair of stops distributed around the orifice and integral with the wall, delimiting between them a cradle for accommodating a protuberance for lateral blocking of the retention device and, on the other hand, means of applying axial stress to the or each protuberance towards the bottom of the cradle;
- the rod is mounted so as to be able to move at least axially with respect to said stud;
- said means of applying stress comprise elastic means of applying stress to the or each protuberance, which elastic means are placed between the stud and the rod;
- the coupling includes a manually actuable knob for driving the rod against the action of the elastic means of applying stress;
- one of the stops is provided at the end of a cam surface suitable for engaging with a protuberance against the elastic means of applying stress while the retention device is passing from the uncoupled position to the coupling position; and
- the means of applying stress include corresponding threads made on the rod and the stud.

The invention will be more clearly understood on reading the description which follows, given solely by way of example, and with reference to the drawings in which.

Figure 1:
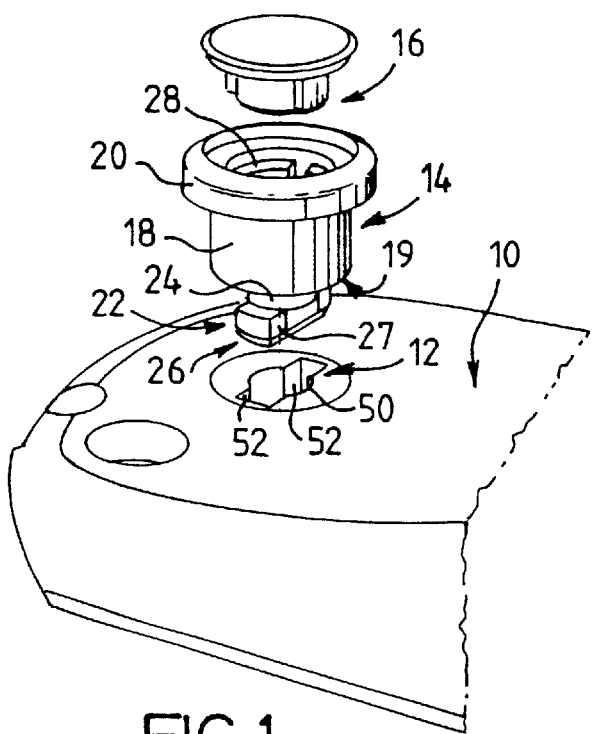
FIG. 1 is an exploded perspective view of the elements of the releasable coupling in the uncoupled position.

Shown partially in FIG. 1 is the rear face 10 of a mobile telephone. This face has an orifice 12 suitable for the releasable coupling of a suspension stud 14 which is able to allow the mobile telephone to be suspended from a suitable fork engaged on the user's belt. Furthermore, this figure shows a plug 16 for closing off the orifice 12. The latter can also be inserted into the stud 14, as will be explained below.

The stud 14 has a hollow body defined by a cylindrical side wall 18 closed off by a bottom 19 intended to bear on the rear face 10 of the telephone. The wall 18 is bordered at its free end opposite the bottom 19 by a peripheral flange 20 which defines a shoulder for the retention of the stud engaged between the two branches of the suspension fork.

The stud 14 is extended axially beyond the bottom 19 by a device 22 for axial retention of the stud. This device is made as one with the body of the stud. It is intended to be accommodated in the orifice 12 in order to perform the coupling.

The retention device 22 includes a cylindrical rod 24, the length of which is suitable for passing right through the thickness of the wall 10, through the orifice 12. And its free end, the rod 24 has means 26 for bearing axially around the perimeter of the orifice on that face of the wall 10 which is opposite that carrying the stud. The axial bearing means 26 have a crosspiece extending perpendicular to the rod 24. This crosspiece is defined by two diametrically opposed protuberances 27.

The retention device 22 can be rotated about the axis of the rod 24 between a position in which the stud is coupled, in which the bearing means 26 are applied against the internal surface of the wall 10 in order to retain the stud 14, and an uncoupled position in which the bearing means 26 are disengaged from the wall 10 through the orifice 12.

Furthermore, the stud 14 includes a lock 28 for immobilizing the retention device 22 with respect to the wall 10 in its coupling position. The lock 28 can be moved axially with respect to the stud 14.

Figure 2:
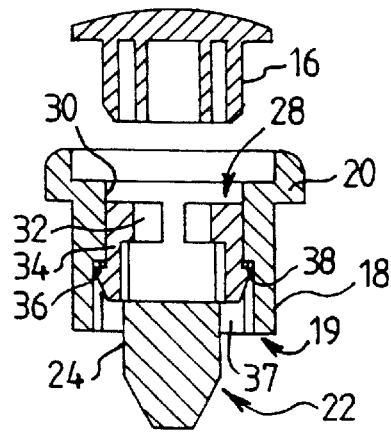
FIG. 2 is a longitudinal sectional view of the suspension stud by itself, in the unlocked position.
Figure 3:
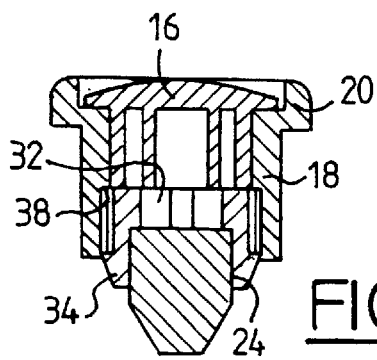
FIG. 3 is a view similar to that in FIG. 2 of the suspension stud in the locked position.

The latter is shown on a larger scale in FIGS. 2 and 3.

In these figures, it may be seen that the side wall 18 of the stud axially delimits a cylindrical cavity 30 emerging on the opposite side from the retention means 22. The immobilizing lock 28 is fitted so as to slide axially inside the cylindrical cavity 30. It comprises a ring 32 split transversely. This ring is integral with two diametrically opposed legs 34 which extend along the axis of the stud. Each leg is provided with an external catch 36.

The legs 34 extend through slots 37 made on each side of the rod 24 in the bottom 19. Thus, the slots 37, in which the legs 34 are guided, ensure that the lock 28 and the stud 14, and therefore consequently also the retention device 22 are prevented from rotating.

The slots 37 extend radially into the thickness of the side wall 18 so as to delimit shoulders 38 suitable for engaging with the catches 36. The latter provide the axial retention of the lock 28 inside the stud 14.

The grooves extending the slots 37 also ensure that the lock 28 and the stud 37 are always prevented from rotating when the lock is accommodated in the cavity 30 and that the legs 34 thus no longer pass through the bottom 19. The split ring 32 acts as an internal spring clip which, by elasticity, presses the legs 34 against the wall 18, thus ensuring that the catches 36 are held in place in the grooves extending the slots 37.

The lock 28 is able to slide along the axis of the stud between an unlocking position of the coupling and a locking position of the coupling.

The unlocking is shown in FIG. 2. In the latter, the free ends of the legs 34 are accommodated inside the cylindrical body of the stud. The catches 36 in this case bear on the shoulders 38.

The unlocking position is shown in FIG. 3. In this position, the free ends of the legs 34 project outside the body of the stud along the rod 24. In this position, the ring 32 bears on the bottom 19 of the cylindrical cavity 30, limiting the extent of movement of the lock 28. When the stud is coupled to the rear wall of the telephone, the ends of the legs are accommodated in the orifice 12 and prevent the stud from rotating with respect to the wall, as will be explained below.

The orifice 12 made in the wall 10 of the mobile telephone has, at its centre, a circular passage 50, on each side of which there are two coaxial notches 52 emerging into the passage 50. These notches 52 are suitable for allowing passage of the protuberances 27 of the retention device 22.

Figure 4:
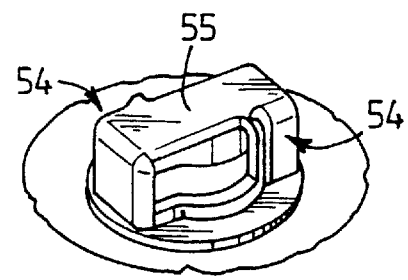
FIG. 4 is a perspective view from below of the orifice made in the wall of the mobile telephone.
Figure 5A:
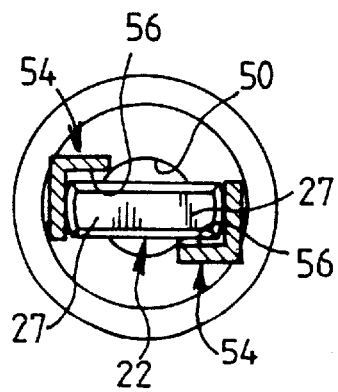
FIGS. 5A and 5B are detailed sectional views from below of the coupling taken in the direction of the arrows F5 in FIG. 6, the stud being uncoupled and coupled, respectively.
Figure 5B:
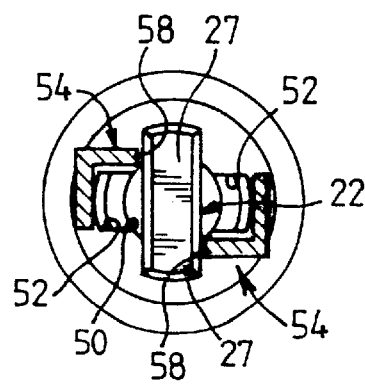

As shown in FIGS. 4, 5A and 5B, two pairs of stop surfaces are defined on diametrically opposed pillars 54, one 56 of which is placed along one edge of the notches 52 and the other 58 of which extends on the perimeter of the orifice 12 perpendicular to the axis of the notches 52.

The pillars 54 are linked via a transverse wall 55 extending opposite the orifice 12. This wall conceals the inside of the mobile telephone and prevents objects from getting into it through the orifice 12.

As shown in FIG. 5A, the two surfaces 56 of the pillars 54, which extend along the notches 52, define stops preventing the retention device 22 from rotating in one direction after insertion of the latter into the orifice 12.

As illustrated in FIG. 5B, the two faces 58 of the pillars 54, facing the passage 50, define end stops for the protuberances 27 when the retention device 22 is in a coupling position.

Thus, it will be understood that the stop surfaces 56 and 58 allow a maximum angular movement of 90° of the retention device 22 engaged in the orifice 12.

In FIG. 5B, the retention device 22 is shown in its coupling position while in FIG. 5A it is shown in its uncoupled position.

Figure 6:
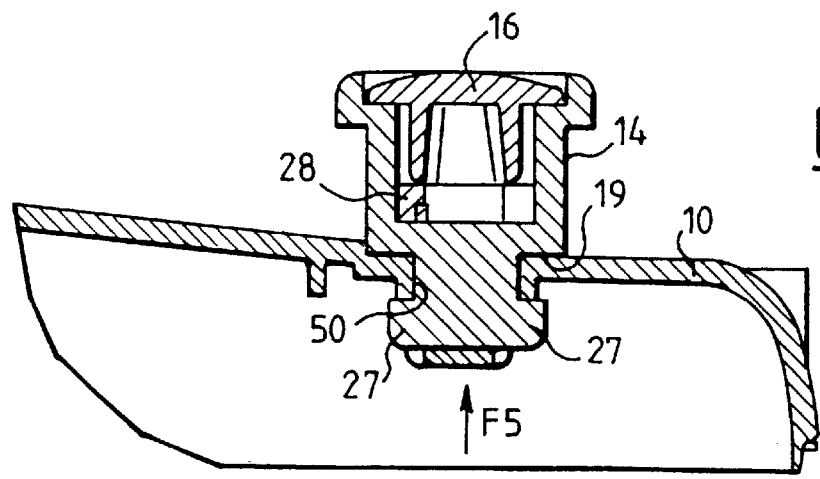
FIG. 6 is a partial longitudinal sectional view of the telephone with the stud coupled and locked.

In the coupling position, also illustrated in FIG. 6, the protuberances 27 bear on that surface of the wall 10 which is opposite that on which the bottom 19 of the stud bears. Thus, the stud is prevented from moving axially, the wall 10 being gripped between the base of the cylindrical section 18 and the protuberances 27.

Figure 7:
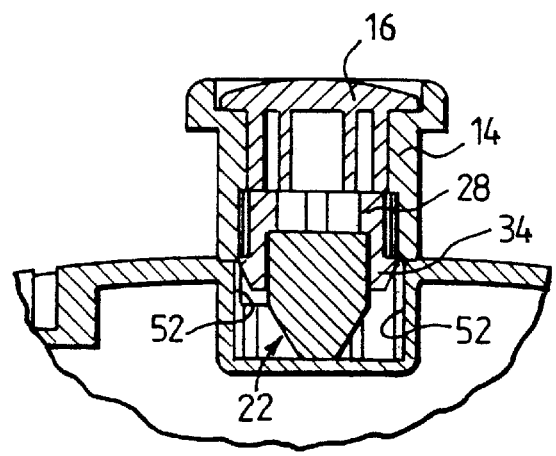
FIG. 7 is a cross-sectional view of the telephone showing the coupling of the stud in the locked position.

As illustrated in FIG. 7, when the immobilizing lock 28 of the retention device is brought into the locking position, the free ends of the legs 34 are accommodated in the notches 52.

Thus, the stud 14 is prevented from rotating with respect to the wall 10 and can no longer be uncoupled.

Furthermore, the engagement of the plug 16 in the cylindrical cavity 30 helps to keep the lock 22 in the locking position and prevents the loss of the plug when the orifice 12 is occupied by the retention device 22 of the stud.

As a general rule, the lock 28 is held in place in the locking position by friction of the lock 28 against the inside of the wall 18. This is made possible by the centrifugal pressure exerted, by elasticity, by the split ring 32. The plug 16 also serves for the user to be able to push on the lock for the cavity 30, the diameter of which is less.

Advantageously, the support which is fixed to the belt and in which a fork for accommodating the stud is made, has, opposite the position occupied by the stud, a projection for bearing elastically on the plug 16 so as to press the lock 28 into its locking position.

Figure 8:
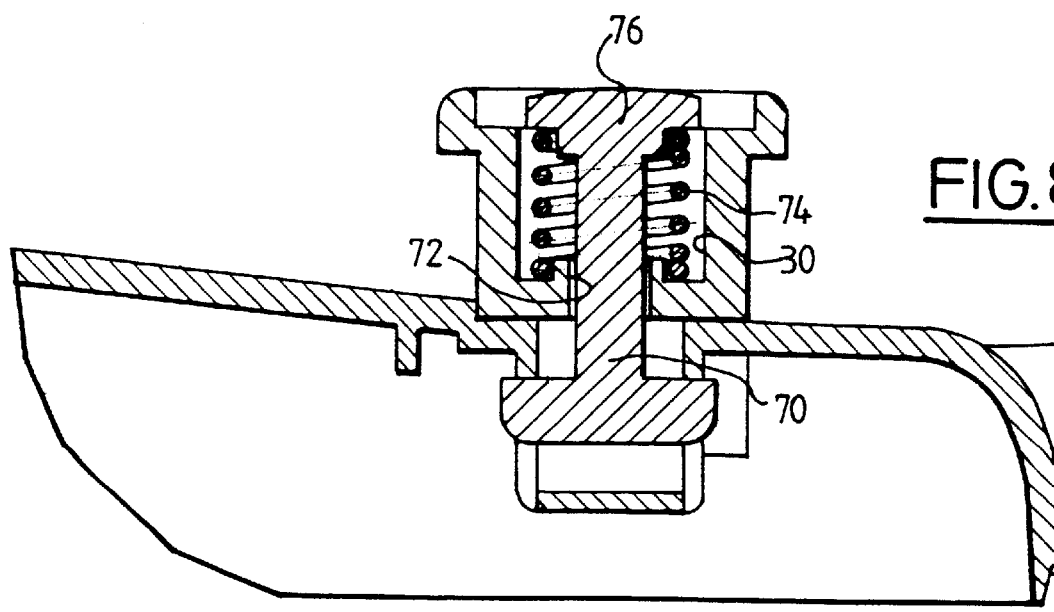
FIGS. 8 and 9 are partial longitudinal sectional views of the telephone showing two different embodiments of the releasable coupling according to the invention.
Figure 9:
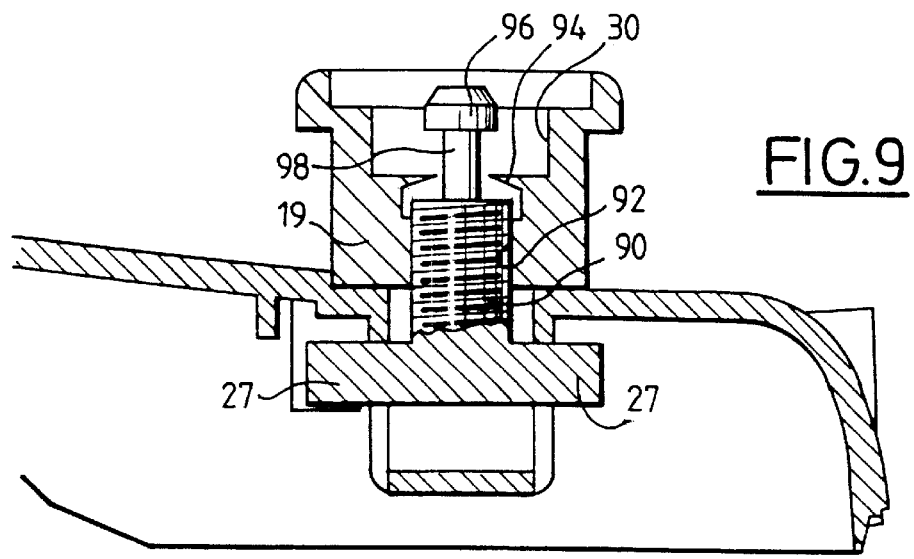

FIGS. 8 and 9 shows two other embodiments of the releasable coupling for a suspension stud. In these two embodiments, the elements identical or similar to those in the embodiment of FIGS. 1 to 7 are denoted by the same reference numbers.

In these two embodiments, the retention means 22 have, as previously, two diametrically opposed protuberances 27 suitable for engaging with stops made on the internal face of the wall 10. The protuberances 27 are based at the end of a rod 70 which can move at least axially with respect to the body of the stud 14.

In these embodiments, means of applying axial stress to the protuberances 27 towards the wall 10 of the mobile telephone are furthermore provided.

In the embodiment in FIG. 8, the rod 70 can slide in a hole 72 made in the bottom 19 of the stud. This hole forms a bearing surface and guides the rod. Advantageously, the rod 70 has a flat suitable for engaging with a complementary flat on the guiding bearing surface provided in the bottom of the stud. Thus, the body of the stud and the rod 70 are prevented from rotating. In particular, the cross sections of the rod 70 and of the bearing surface 72 may be polygonal, and especially hexagonal.

The means of applying stress to the protuberances 27 comprise a helical spring 74 accommodated inside the cylindrical cavity 30 made in the body of the stud. The spring 74 bears at one end on the bottom 19 of this cavity. At its other end, it bears on a knob 76 made at that end of the rod 70 which is opposite the end bearing the protuberances 27. The diameter of the knob 76 is less than the diameter of the cylindrical cavity 30 so as to allow relative axial movement between them.

As a variant, the rod 70 and the bearing surface 72 have a circular cross section. The rod is therefore prevented from rotating with respect to the body of the stud by complementary flats made on the knob 76 and the cavity 30.

Figure 10:
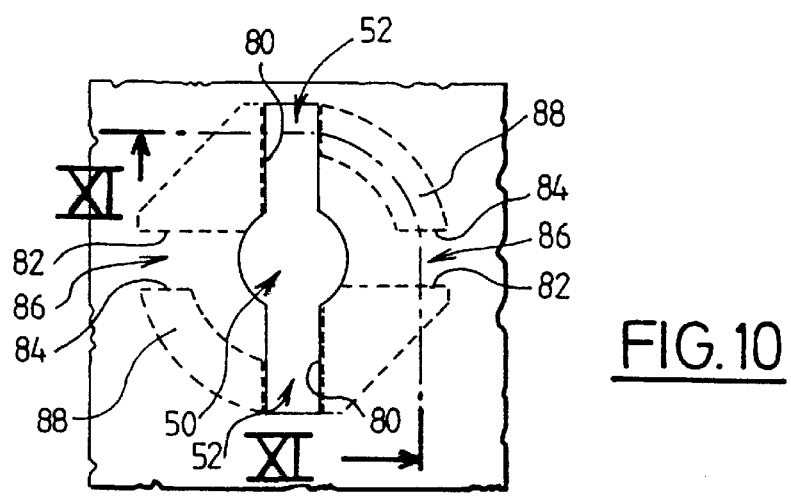
FIG. 10 is a view of the orifice made in the wall of the mobile telephone in FIGS. 8 and 9, seen from the outside.
Figure 11:
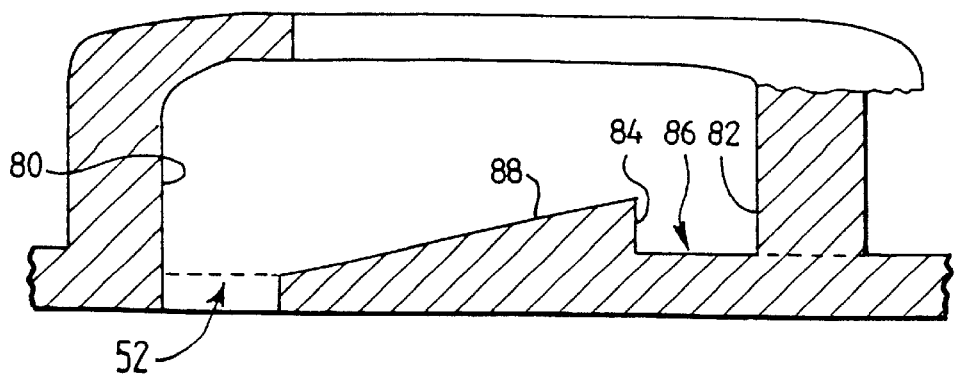
FIG. 11 is an expanded view of the stops, carried by the wall of the telephone, which are shown in FIG. 10, along the line of section XI—XI in this FIG. 10.

As shown in FIG. 10, for the two embodiments in FIGS. 8 and 9, the wall 10 has an orifice 12 similar to that in FIG. 1. However, the stops placed around the orifice 12 on the inner face of the wall 10 are different. These are shown from below and in expanded form in FIGS. 10 and 11, respectively.

Two first stop surfaces 80 are placed laterally along the notches 52 so as to impose a direction of rotation on the retention device 22.

A second stop surface 82 is angularly offset about the axis of the passage 50 by 90° with respect to a stop surface 80. This stop ensures retention of a protuberance 27 when the axial retention means 22 are in their coupling position.

The stops 80 and 82 are similar to the stops 56 and 58 of the previous embodiment, respectively.

Furthermore, third end stops surfaces 84 for the protuberances 27 are placed opposite the second stop surfaces 82. Cradles 86 for accommodating the protuberances 27 are defined between these second and third stop surfaces. The third stop surfaces 84 are each formed by a step provided at the end of ramps 88 whose height gradually increases from the edge of the notch 52 as far as the surface 84. The ramps 88 are curved and wound around the axis of the passage 50.

The coupling of the stud 14 to the wall 10 takes place in the following manner.

The protuberances 27 are inserted through the notches 52 of the orifice. The stud 14 is then rotated clockwise. Movement in the opposite direction is prevented by the stop surfaces 80.

While the stud 14 is being rotated, the protuberances 27 engage with the cam-forming ramps 88. Thus, the spring 74 is gradually compressed. When the protuberances 27 get beyond the end of the ramps 88, they are accommodated in the cradles 86 where they are held in place fixed by the facing stops 82 and 84. Furthermore, under the action of the spring 74, the protuberances 27 are held in place against the bottom of the cradle 86, preventing them from being disengaged.

In this position, the wall 10 is gripped between the protuberances 27 and the base of the stud 14.

In order to uncouple the stud, the operator presses on the knob 76 so as to compress the spring 74. During this compression operation, the protuberances 27 are disengaged from the cradle 86 and can thus get beyond the step defining the third step surfaces 84. The stud is then unlocked.

By rotating the stud 14 in the anticlockwise direction, it is then possible to align the protuberances 27 with the notches 52 in the orifice in order to uncouple the stud.

In the embodiment shown in FIG. 9, the means of applying axial stress include complementary threads carried by the bottom of the stud 14 and the rod carrying the retention means.

Thus, the axial retention means have two protuberances 27 provided at the end of a threaded rod 90 which is screwed into a tapped hole 92 provided axially through the bottom 19 of the stud.

The tapped hole 92 is bordered at its end emerging in the cylindrical cavity 30 of the stud by radial teeth 94 suitable for engaging with a head 96 carried at the end of a small-diameter cylindrical intermediate section 98 which extends the threaded rod 92 axially.

The thread made on the rod 90 makes it possible, by screwing in the stud 14, to hold the protuberances 27 in place applied against the inner surface of the wall 10. On the other hand, by unscrewing the stud it is possible to move the protuberances 27 away from the wall 10 so as to unlock them and then to uncouple the stud.

The coupling described in FIG. 9 operates in the following manner.

In order to couple the stud to the wall 10, the stud is unscrewed so that the bottom of it is away from the protuberances 27. The unscrewing operation may be carried out by introducing the retention means 22 into the orifice 12 and by rotating the body 14 of the stud anticlockwise. The protuberances 27 then butt against the stops 80, preventing the rod carrying the retention means from rotating and consequently preventing unscrewing.

The protuberances 27 are introduced through the orifice 12. The stud is then moved angularly through 90° in order to be brought into its coupling position. During this movement, the rod 90 carrying the retention means is frictionally driven firmly by the rod in the thread until the protuberances 27 come into contact with the stops 82. This frictional driving is made possible because the protuberances 27 are away from the bottom of the stud, thereby allowing them to move without contacting the ramps 88. When one of the protuberances is in contact with the second stop surface 84, the stud 14 is screwed in so that the protuberances 27 are applied against the bottom of the cradles 86, thereby locking the stud in its coupled position.

In order to uncouple the stud, the body of the latter is unscrewed, allowing the protuberances 27 accommodated in the cradles 86 to be disengaged sufficiently from the wall 10 so that these protuberances can get past the step 84. The rod 90 carrying the protuberances 27 is then moved angularly through 90° so as to align the protuberances 27 with the notches 54 in the orifice. The stud may then be separated from the wall 10.

In practice, the screwing or unscrewing and rotational movements of the stud are combined so that the coupling or uncoupling is perceived by the user as simply screwing in or unscrewing the stub.

The presence of the radial teeth 94 makes it possible, by engagement with the head 96, to ensure that the rod 90 is permanently linked to the body of the stud.

Whatever the embodiment envisaged, the coupling requires only one orifice made through the rear wall of the telephone, it being possible for this orifice to be delimited directly in the thickness of the latter without it being necessary to use an added metal insert. Thus, the manufacturing cost is reduced.

Furthermore, the stud equipped with the coupling means may be easily coupled to the wall 10.

The presence of the means for locking the coupling makes it possible to avoid any risk of the stud being accidentally decoupled.

What is claimed is:

1. Releasable coupling for a suspension stud on a first face of a wall, especially of a casing of a mobile item of telecommunication, of the type comprising:
   an orifice made in the wall and emerging on said first face of the wall; and
   a device for axial retention of the stud, a coupling end of which is accommodated in said orifice in order to perform the coupling,
   characterized in that said orifice emerges on the second face of the wall opposite said first face and said retention device includes a rod which passes through the orifice and is provided at its free end with means for bearing axially around the perimeter of the orifice on the second face of the wall, which retention device can move, along a coupling path, between a coupling position in which the axial bearing means are applied against the second face of the wall, the wall lying between the stud and the axial bearing means, and an uncoupled position in which the axial bearing means are disengaged from said wall, and in that means are provided for immobilizing the retention device with respect to the wall in its coupling position.

2. Coupling according to claim 1, characterized in that said coupling path is defined by a rotational movement about the axis of the rod.

3. Coupling according to claim 2, characterized in that said bearing means include at least one protuberance extending transversely at the free end of the rod and in said orifice has, for the or each protuberance, a notch emerging in that region of the orifice which is intended for passage of the rod.

4. Coupling according to claim 3, characterized in that said immobilizing means include a lock linked in rotation with said retention device, which lock can move between an unlocked position in which the retention device can be rotated and a locking position in which the retention device is prevented from rotating with respect to the wall.

5. Coupling according to claim 4, characterized in that a device is provided for reinforcing the retention of the lock in its locking position.

6. Coupling according to claim 5, characterized in that said retention-reinforcing device is either a plug for closing off the orifice in the absence of the suspension stud, or a projection made on a support having a profile suitable for retaining said stud.

7. Coupling according to claim 4, characterized in that the lock is disengaged from the notches in its unlocked position and is engaged in at least one notch in its locking position.

8. Coupling according to claim 7, characterized in that a device is provided for reinforcing the retention of the lock in its locking position.

9. Coupling according to claim 8, characterized in that said retention-reinforcing device is either a plug for closing off the orifice in the absence of the suspension stud, or a projection made on a support having a profile suitable for retaining said stud.

10. Coupling according to claim 3, characterized in that said immobilizing means include, on the one hand, a pair of stops distributed around the orifice and integral with the wall, delimiting between them a cradle for accommodating a protuberance for lateral blocking of the retention device and, on the other hand, means of applying axial stress to the or each protuberance towards the bottom of the cradle.

11. Coupling according to claim 10, characterized in that one of the stops is provided at the end of a cam surface suitable for engaging with a protuberance against the elastic means of applying stress while the retention device is passing from the uncoupled position to the coupling position.

12. Coupling according to claim 10, characterized in that the means of applying stress include corresponding threads made on the rod and the stud.

13. Coupling according to claim 10, characterized in that the rod is mounted so as to be able to move at least axially with respect to said stud.

14. Coupling according to claim 13, characterized in that one of the stops is provided at the end of a cam surface suitable for engaging with a protuberance against the elastic means of applying stress while the retention device is passing from the uncoupled position to the coupling position.

15. Coupling according to claim 13, characterized in that said means of applying stress comprise elastic means of applying stress to the or each protuberance, which elastic means are placed between the stud and the rod.

16. Coupling according to claim 15, characterized in that one of the stops is provided at the end of a cam surface suitable for engaging with a protuberance against the elastic means of applying stress while the retention device is passing from the uncoupled position to the coupling position.

17. Coupling according to claim 15, characterized in that it includes a manually actuable knob for driving the rod against the action of the elastic means of applying stress.

18. Coupling according to claim 17, characterized in that one of the stops is provided at the end of a cam surface suitable for engaging with a protuberance against the elastic means of applying stress while the retention device is passing from the uncoupled position to the coupling position.

* * * * *